(12) United States Patent
Russell et al.

(10) Patent No.: US 8,405,662 B2
(45) Date of Patent: Mar. 26, 2013

(54) GENERATION OF VIDEO

(75) Inventors: George Russell, Edinburgh (GB); Andrew Richards, Edinburgh (GB)

(73) Assignee: ITI Scotland Limited, Glasgow (GB)

( * ) Notice: Subject to any disclaimer, the term of this patent is extended or adjusted under 35 U.S.C. 154(b) by 1047 days.

(21) Appl. No.: 12/333,178

(22) Filed: Dec. 11, 2008

(65) Prior Publication Data

US 2009/0147010 A1 Jun. 11, 2009

Related U.S. Application Data

(63) Continuation-in-part of application No. 11/773,304, filed on Jul. 3, 2007.

(60) Provisional application No. 61/013,805, filed on Dec. 14, 2007.

(30) Foreign Application Priority Data

Jul. 4, 2006 (GB) .................................. 0613275.7

(51) Int. Cl.
*G06T 13/00* (2011.01)
(52) U.S. Cl. ........ 345/473; 345/474; 345/475; 386/290; 715/723; 715/724; 715/725; 715/726; 715/972
(58) Field of Classification Search .......... 345/473–475; 386/290; 715/723–726, 972
See application file for complete search history.

(56) References Cited

U.S. PATENT DOCUMENTS

| | | | |
|---|---|---|---|
| 4,342,454 A | 8/1982 | Baer et al. | |
| 4,954,941 A | 9/1990 | Redman | |
| 5,047,925 A | 9/1991 | Kun et al. | |
| 5,060,150 A | 10/1991 | Simor | |
| 5,191,645 A | 3/1993 | Carlucci et al. | |
| 5,237,648 A * | 8/1993 | Mills et al. | .................... 715/723 |
| 5,395,242 A | 3/1995 | Slye et al. | |
| 5,418,952 A | 5/1995 | Morley et al. | |
| 5,519,875 A | 5/1996 | Yokoyama et al. | |
| 5,553,864 A | 9/1996 | Sitrick | |
| 5,556,108 A | 9/1996 | Nagano et al. | |

(Continued)

FOREIGN PATENT DOCUMENTS

EP 0653705 5/1995
EP 1158741 11/2001

(Continued)

OTHER PUBLICATIONS

Extended Search Report from the European Patent Office on co-pending EP application (07123233.4) dated May 13, 2008.

(Continued)

*Primary Examiner* — Xiao M. Wu
*Assistant Examiner* — Todd Buttram
(74) *Attorney, Agent, or Firm* — Klein, O'Neill & Singh, LLP

(57) ABSTRACT

An apparatus and a method are provided for generating video data derived from the execution of a computer program. In a first mode, the apparatus is operable to (a) execute a computer program comprising one or more components executed in a sequence of execution frames, each execution frame having a given state; and (b) record video data comprising a sequence of video data frames corresponding to the sequence of execution frames. In a second mode, the apparatus is operable to (c) process video data which have been recorded during the previous execution of the program, to allow a visualization of the execution of that program; and (d) allow a user, at any frame of the sequence of video data frames, to change the mode to the first mode and to obtain from the video data the state of the corresponding execution frame of the program.

24 Claims, 10 Drawing Sheets

U.S. PATENT DOCUMENTS

| | | | |
|---|---|---|---|
| 5,586,317 A | 12/1996 | Smith | |
| 5,680,533 A | 10/1997 | Yamato et al. | |
| 5,852,502 A | 12/1998 | Beckett | |
| 5,956,485 A | 9/1999 | Perlman | |
| 6,201,531 B1* | 3/2001 | Gonsalves et al. | 345/593 |
| 6,278,466 B1* | 8/2001 | Chen | 345/473 |
| RE38,401 E * | 1/2004 | Goldberg et al. | 715/720 |
| 6,699,127 B1 | 3/2004 | Lobb et al. | |
| 6,791,538 B2* | 9/2004 | Van Vugt | 345/204 |
| 7,120,877 B2 | 10/2006 | Gabbert et al. | |
| 7,433,306 B2 | 10/2008 | Dugan et al. | |
| 7,761,847 B2 | 7/2010 | Kornerup et al. | |
| 7,873,872 B1 | 1/2011 | Shillington et al. | |
| 7,953,315 B2* | 5/2011 | Bennett | 386/353 |
| 2002/0040470 A1 | 4/2002 | Guthrie et al. | |
| 2002/0145629 A1 | 10/2002 | Gabbert et al. | |
| 2003/0056200 A1 | 3/2003 | Li et al. | |
| 2003/0204838 A1 | 10/2003 | Caspole et al. | |
| 2004/0210890 A1 | 10/2004 | Armstrong et al. | |
| 2005/0010608 A1 | 1/2005 | Horikawa | |
| 2005/0155073 A1* | 7/2005 | Lecomte | 725/96 |
| 2005/0221898 A1 | 10/2005 | Gatto et al. | |
| 2006/0026560 A1 | 2/2006 | Kornerup et al. | |
| 2006/0050647 A1 | 3/2006 | Dugan et al. | |
| 2007/0011660 A1* | 1/2007 | Garyali et al. | 717/127 |

FOREIGN PATENT DOCUMENTS

| | | |
|---|---|---|
| EP | 1599012 | 11/2005 |
| WO | WO2007/085855 | 8/2007 |

OTHER PUBLICATIONS

Extended Search Report from the European Patent Office on co-pending EP application (07123229.2) dated Aug. 18, 2008.

Kacsuk P.; "Systematic Macrostep Debugging of Message Passing Parallel Programs"; Future Generations Computer Systems, Elsevier Science Publishers; Amsterdam, Netherlands; vol. 16, No 6, pp. 609-624; Apr. 1, 2000; XP004197220; ISSN: 0167-739X.

Lemay et al.; "Teach Yourself Java in 21 Days"; Sams Publishing; pp. 157- 158; 1996; XP-002463120.

Malony et al.; "Automatic Scalability Analysis of Parallel Programs Based on Modeling Techniques"; Computer Performance Evaluation, Modeling Techniques and Tools; 7th International Conference Proceedings Springer-Verlag Berlin, Germany; pp. 139-158; 1994.

Maskit et al.; "A Message-Driven Programming System for Fine-Grain Multicomputers"; Scalable Concurrent Programming Laboratory; California Institute of Technology; May 16, 1994.

Sanchez-Crespo; "Core Techniques and Algorithms in Game Programming"; New Riders Publishing; Chapter 10, Section "Send State Changes Only"; pp. 310-312; 2004.

Skillicorn et al.; "Models and Languages for Parallel Computation"; ACM Computing Surveys, ACM, New York, NY, US; vol. 30, No. 2, pp. 123-169; Jun. 1, 1998; XP 002454722; ISSN: 0360-0300.

Non-Final Office Action from USPTO dated Mar. 2, 2011 for related U.S. Appl. No. 11/773,304.

Cronin, Eric et al., "A Distributed Multiplayer Game Server System", project report, University of Michigan, Ann Arbor, MI, May 4, 2001.

Extended Search Report from the European Patenet Office on co-pending EP application (07123220.1) dated Jun. 20, 2008.

De Kergommeaux et al.; "Execution Replay of Parallel Procedural Programs"; Journal of Systems Architecture; Elsevier Science Publishers VB.; Amsterdam, Netherlands; vol. 46, No. 10, pp. 835-849; Jul. 1, 2000; XP004206179; ISSN: 1383-7621.

Dickinson: "Instant Replay: Building a Game Engine with Reproducible Behavior"; Internet Citation; [Online] XP001543623; URL: http://www.gamasutra.com/features/20010713/dickinson_01.htm; Retrieved on Oct. 2, 2007.

Lamport; "Time, Clocks, and the Ordering of Events in a Distributed System"; Communications of the Association for Computing Machinery; ACM, New York, New York, US: vol. 21, No. 7, pp. 558-565; Jan. 1, 1978; XP002435094; ISSN: 0001-0782.

Zapart et al; "Make it Machinima Incorporating Gaming Technologies into e-training Application Creation"; Information Technology: Research and Education, 2004; ITRE 2004, 2nd International Conference on London, UK Jun. 28-Jul. 1, 2004, Piscataway, New Jersey, USA; pp. 24-28; Jun. 28, 2004; XP010771110; ISBN: 978-0-7803-8625-9.

Final Office Action from USPTO dated Nov. 21, 2011 for related U.S. Appl. No. 12/333,126.

Non-Final Office Action from related patent application (U.S. Appl. No. 12/333,126, filed Dec. 11, 2008) received from USPTO dated May 23, 2011.

Non-Final Office Action from USPTO dated Sep. 25, 2012 for related US Appl. No. 12/333,189.

* cited by examiner

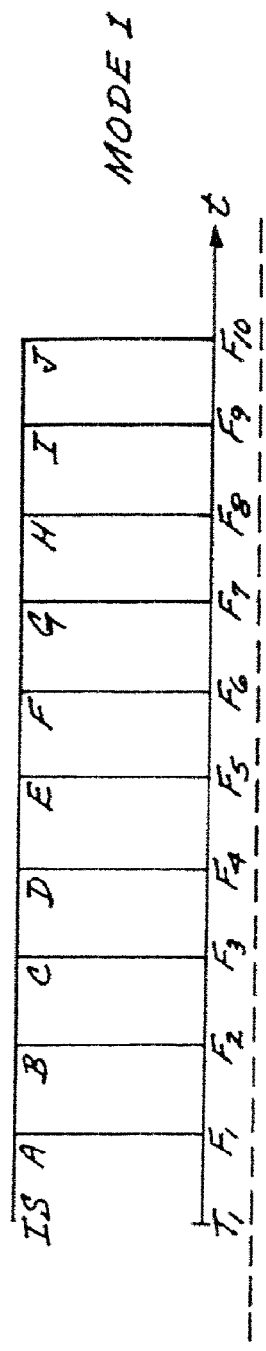
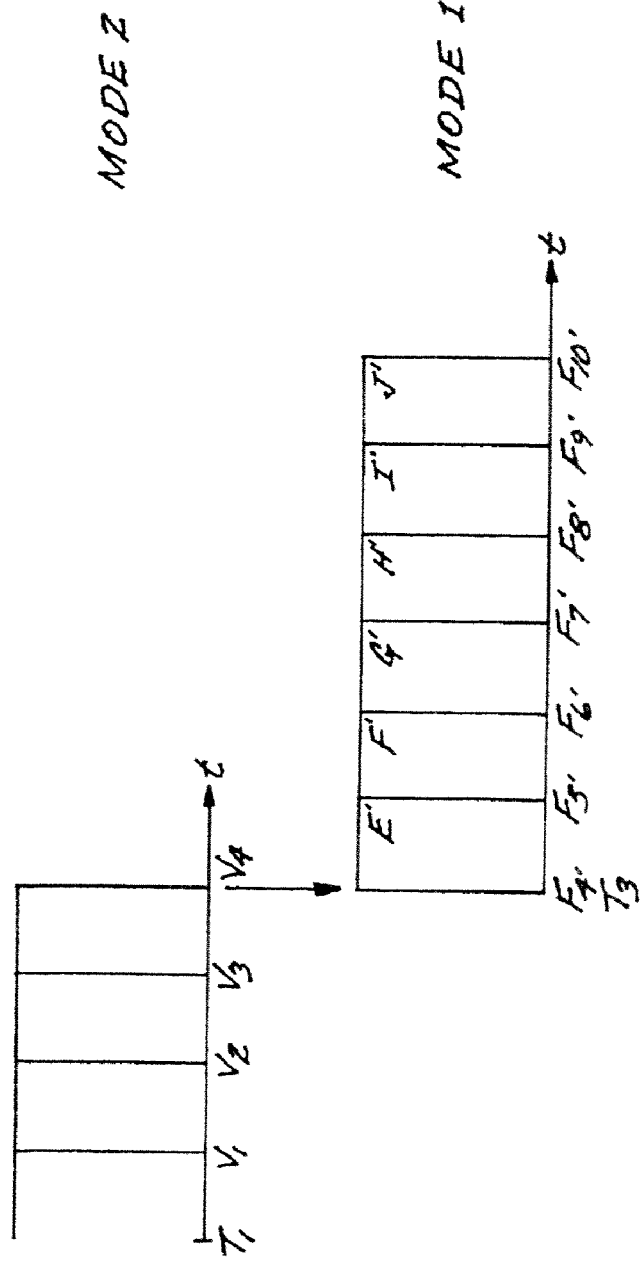
FIG.2A
FIG.2B

GENERATION OF VIDEO

CROSS-REFERENCE TO RELATED APPLICATIONS

This application claims the benefit, under 35 U.S.C. §119 (e), of provisional application No. 61/013,805; filed Dec. 14, 2007, the disclosure of which is incorporated herein by reference in its entirety. This application is also a Continuation-in-Part of co-pending application Ser. No. 11/773,304, filed Jul. 3, 2007, the disclosure of which is incorporated herein by reference in its entirety.

FEDERALLY SPONSORED RESEARCH OR DEVELOPMENT

Not Applicable.

BACKGROUND

This disclosure relates to methods and tools for the generation of video. In particular, the disclosure describes techniques which are useful for generating and directing video sequences set within a virtual environment.

The field of animation has come along way from the early days of 2-D animation, which necessarily involved the generation of a huge number of hand-drawn and painted images which were subsequently filmed, or "shot", on a frame-by-frame basis. In more recent years, 3-D computer generated imagery (CGI) has dramatically enhanced the visual appeal of animated film. Typically, digital video generation involves taking a collection of models within a scene, a camera viewpoint and one or more light sources, to produce an image that depicts the scene from the selected camera view point and with the given level of lighting. A movie is produced by altering, by a set amount, one or more of the set of models (e.g. character movement), the lighting (e.g. fade in/out), or the camera view point (e.g. panning), rendering another frame of film, and repeating this process. The alterations between frames are small, but the cumulative effect is of motion, and thus the video is generated from slightly different images showing changes over time.

Thus, CGI techniques circumvent the laborious process of drawing each frame by hand, each frame instead being digitally "rendered" by means of computerized processing power. This technique therefore offers more efficient production of animated film than is seen by techniques involving hand-drawn images. However, there is still more to be gained, in terms of both cost and time, in producing animated film or video. Indeed, it is typical for the production of an animated film to take several years to complete.

The technical art of machinima involves the application of real-world film-making techniques within a virtual environment, where characters and events are controlled by user input commands, by artificial intelligence, or by script. The production of live machinima demonstrates a number of clear advantages over previously adopted animation production techniques. Not only does it offer the freedom to direct or produce video without the need to rely on key frames, instead allowing users to manipulate character models collaboratively in real time, but it also benefits from considerable time and cost savings. Moreover, with the virtual world depiction of many computer programs now exhibiting superior graphical quality, there is a desire to exploit this graphical excellence in the technical field of film making. The sophistication of computer game graphics continues to increase with every passing year. The current state of the art provides a 3D world with complex models for characters and scenery, one or more moveable cameras, and real time lighting effects such as reflection and shadow casting. One goal of such games is to provide a level of immersion equivalent to that of cinema.

Games often include video sequences. These can either be for narrative purposes, or to replay some sequence of actions in the game. When in-game graphics were more primitive, the video sequences were often pre-rendered. However, with today's level of graphical quality, it is often sufficient to use in game graphics and assets (models, textures) to produce the game videos.

Video can trivially be recorded from games by saving the sequence of frames displayed on a digital display means to the player. However, it is not so straightforward to subsequently edit the generated video. It is known for users to record the visual outcome of their own virtual performance to a digital recording medium, such as a DVD, connected to their own computer display means for subsequent replay. Thus, the viewpoint that is depicted on a user's own display screen is recorded to become film footage set within the medium of a computer game. On a more sophisticated level, a number of game makers have added recording or playback capabilities to their games in order to more readily allow a user to repeatedly view their actions as a non interactive movie. Furthermore, there are many tools available for the generation, lighting and rendering of 3D scenes and the creation of video from multiple renderings.

Despite the significant advantages offered by machinima in terms of cost and time efficiency, the tools and techniques currently available for the production of machinima movie or video are very limited in terms of their film-making capabilities. Even in cases where games developers provide the functionality to record video sequences as part of the game system, this is typically added as an afterthought and is not in-built into the system from the ground up. The usefulness and flexibility of such systems is therefore restricted. In particular, known machinima production systems allow little capacity for a user to interact with, or potentially edit, pre-recorded display frame sequences. At best, it is possible for a user seeking to generate a recorded video sequence to try to direct the visually evolving scene using player input commands which have an impact on the outcome of program execution. It may also be possible for advanced users to edit the scripts which define one or more of the animation sequences that are performed by avatars or props that populate the virtual scene.

However, the potential for editing the video recording is restricted to simply repeating the process of recording a given sequence of execution until the desired result is obtained. This is akin to the classic approach to film making which follows a basic process of: RECORD. EDIT, and PLAY as 3 distinct stages. If additional data are needed or desired at the EDIT stage, it is necessary to go back and RECORD it again. This is a time-consuming process with limited control over the end result. In order to construct the final piece of video, it is necessary for a user to composite the various "takes" and overlay text, audio, etc.

There is therefore a desire to improve techniques for generating recorded video sequences set within a virtual environment. In particular, the present inventors have recognized the need to enhance the capacity for a user to direct, and subsequently edit, a sequence of video data. As such, embodiments of the present invention seek to provide tools and methods for generating and recording video data derived from the execution of a computer program for subsequent display.

SUMMARY OF THE DISCLOSURE

As used in this disclosure, the terms "component" "module", "system," and the like are intended to refer to a computer-related entity or program portion, either software, hardware, a combination of hardware and software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, carried, or encoded, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick (flash memory) or any other device, in accordance with the claimed subject matter.

According to the present invention there is provided an apparatus for generating video data derived from the execution of a computer program, the apparatus having first and second modes of operation, wherein, in the first mode of operation, the apparatus is operable to execute a computer program comprising one or more components, wherein the execution of each component is conducted in a sequence of execution frames, each execution frame having a given state, the apparatus being further operable in said first mode of operation to record video data comprising a sequence of video data frames corresponding to the sequence of execution frames; wherein, in the second mode of operation, the apparatus is operable to process video data which have been recorded during the previous execution of a computer program, in order to allow a user to obtain a visualization of the execution of that computer program; and wherein, in the second mode of operation, the apparatus is further operable to allow a user, at any frame of said sequence of video data frames, to change the mode of operation of the apparatus to the first mode of operation and to obtain from said video data the state of the corresponding execution frame of the computer program.

Thus, embodiments of the present invention enable a user to switch between a state in which the apparatus is operating in a replay mode (i.e. the second mode), in which the user will be merely an observer having no control of the changing visual display, and an execute mode (i.e. the first mode) in which the user is able to influence the result of execution, for example via input commands which have an impact on the behavior or action of one or more of the components of the program. In the context of a computer game, for example, a user could watch a sequence depicting a previous execution of the game, and begin playing the game at any point within that sequence. It therefore becomes possible for a player to start from the end of a video sequence, i.e. the video is a prelude to the point at which the game is controlled by the player. In other words, for the duration of the video, the player is not in control of the game, and control is given once the video ends.

The visual result of executing the computer program may be observed, most generally, from a given camera position. This may be, for example, selected to be the perspective of a user, or from the perspective of any of the participants or virtual characters of the program.

It will be appreciated that an execution frame preferably comprises a number of items, such as program components and communications, e.g. messages, which are either intended for a component within that frame or are being sent to a component in a different frame. Thus, in this case, the state of a frame will be determined by the state of the items, e.g. program components and communications, within the frame. In order to obtain a visualization of the changing state of a sequence of execution frames, or re-examination frames, the state of a frame is queried to obtain display data which allow the visual representation of the state to be drawn on a display means.

A component may consist of an object, i.e. a discrete item forming part of a computer program comprising data and procedures necessary to operate on that data. The terms "object" and "component" are used interchangeably throughout the present disclosure. An apparatus embodying the present invention is preferably provided with an execution environment which is structured to facilitate the execution of object code, or a component of the program, in "frames", or units of time or work. The provision of an execution environment operable to execute program components in a sequence of frames is advantageous in that it naturally facilitates a correspondence (which may, or may not be, a one-to-one correspondence) between a sequence of video data frames and the sequence of execution frames from which the video data frames have been generated. This important feature enables a user to easily change from a replay mode (second mode) to an execution mode (first mode).

Preferably, but not essentially, the apparatus causes a change from the second mode to the first mode at the end of a frame, or between two frames, since this is the most natural point. It will be appreciated that there will be at least one frame latency before a mode change procedure in response to a user operating an apparatus embodying the present invention.

In the context of the present disclosure, "video data" should be interpreted as meaning data, which may include code, which directly or indirectly allow the visual result of a previously executed sequence of execution frames, to be subsequently replayed to a user. The video data may advantageously allow the replay of the visual and/or auditory result as perceived by, or from the perspective of, the user of the machine that performed the execution of the corresponding computer program from which the video data has been generated. Alternatively, video data frames may be recorded from any position within the virtual world, it will be appreciated that the video data may be processed to allow the visualization to play either forwards or backwards in either real-time, more quickly (e.g. fast-forward) or more slowly (e.g. slow motion).

Preferably, the video data comprise, or can be processed to produce, replay data, e.g. data which allow re-execution of the original sequence of execution frames in order to obtain a visualization of that re-execution. The video data may comprise the initial state of the program components at the start of the execution sequence, together with a stored time line of interactions or communications (including the user-derived input commands) which took place during the execution sequence between program components. This information preferably allows the state of any frame of a previously executed computer program to be recreated. Thus, in cases where the video data comprise replay data, this must be sufficient to allow the state of any frame of execution to be recreated. Once a given frame state has been re-created from the replay data, the video data may be processed in order to obtain a visualization of the corresponding original execution sequence, from the recreated frame, by performing execution using the stored timeline of interactions, rather than real-time input commands provided by one or more users. This approach is particularly suited for video intended to be displayed "in game", wherein the apparatus is operable to utilize the execution environment, or runtime system, of the computer system in both modes of operation.

The reader will appreciate the possible duality of execution data and video data, wherein the video data comprise re-execution data, in that this data may actually be the same. However, the mechanisms for interacting with it, and visualizing it, will differ between the first mode and the second mode.

Embodiments of the present invention which rely upon video data in the form of data which comprise, or can be processed to comprise, replay or "re-execution" data are particularly advantageous as a tool useful for directing the generation of video or movie sequences set within a virtual environment. According to a particularly preferred embodiment, the apparatus is operable in said second mode to allow a user to modify the state of one or more frames comprised in the sequence of re-execution data. Execution (first mode) can then be resumed on the basis of a sequence of modified execution frames. In this way, it is possible to interact with and edit recorded video data. Thus, by interacting with recorded video data a user has the capability of being able to direct the visually evolving scene and can advantageously modify a recorded video sequence, at any point within that sequence, without the need to re-execute an entire sequence several times. This functionality saves a significant amount of time in the production of a virtual film, since the necessity to record multiple sequences and to composite the various takes together is averted.

For example, when developing a virtual film, it may be desirable to incorporate a sequence of additional material between two frames of a pre-recorded sequence. Embodiments of the present invention are also beneficial in that a user can go back and forth along the video frame sequence thereby providing the capability to revert to the first mode of operation at any point, thereby, in effect, facilitating the interaction with recorded video data at any point. As the reader will appreciate, the ability to perform re-wind and undo operations is especially useful for a user seeking to generate and direct the production of a machinima film.

Numerous other forms of modification are possible in order to change and edit the resultant visualizations. For example: one or more items may be deleted or added to a given frame and/or one or more existing items may be mutated.

In particularly preferred embodiments, the apparatus comprises a so-called "deterministic" execution environment, meaning that the apparatus is operable to facilitate the execution of a computer component with a high degree of determinism. A deterministic execution environment ensures that if the same component in the same state executes the same code at two different times, then the new state of the object will be identical on both machines or at both times. As such, it will be appreciated that video data can be exactly replayed within a deterministic execution environment. Thus, it is envisaged that preferred embodiments of the present invention rely upon the ability of the apparatus to provide deterministic execution of program components, which ensures that the visualization of an interactive execution sequence, and a subsequent replay of that same execution sequence, are substantially identical.

According to a second aspect of the present invention, there is provided a method for generating video data derived from the execution of a computer program, the method comprising:
i) executing one or more components of a computer program in an execution environment operable such that the execution of each component is conducted in a sequence of execution frames;
ii) during said execution, recording video data corresponding to said sequence of execution frames, wherein said video data are sufficient to allow the state of any frame of execution to be recreated;
iii) obtaining a desired sequence of re-execution frames from said video data;
iv) executing the sequence of re-execution frames obtained in step iii) in said execution environment;
v) pausing the execution of said sequence of re-execution frames at a given frame to obtain a candidate frame; and
vi) modifying the state of said candidate frame to obtain a modified sequence of re-execution frames.

According to a third aspect of the present invention, there is provided a method for generating video data derived from the execution of a computer program, the method comprising:
i) obtaining a desired sequence of re-execution frames from video data recorded during the previous execution of a computer program comprising one or more components;
ii) executing said sequence of re-execution frames in an execution environment operable such that the execution of each component is conducted in a sequence of execution frames;
iii) pausing the execution of said sequence of re-execution frames at a given frame to obtain a candidate frame having a give state; and
iv) modifying the state of said candidate frame to obtain a modified sequence of re-execution frames.

Thus, it will be appreciated that the step of modifying the state of a candidate frame, forming one of the frames of re-execution, is an important feature of the present invention. This process of modifying, or interacting with, recorded video data allows a user to readily edit and easily direct production of a video sequence, set in a virtual environment, may be performed using video data generated by the user, or already generated.

In US Patent Application Publication No. 2008/0127200, the entire content of which is incorporated herein by way of reference thereto, an execution environment for a computer system is proposed which is structured to facilitate the execution of code in "frames," or units of time or work. According to the teaching of US 2008/0127200, the execution of one or more components of a computer program is advantageously carried out in a plurality of sequential frames of execution, wherein the execution environment is further operable to:
i) allow communication between one said component and another said component in different frames of execution; and ii) prevent communication between one said component and another said component in the same frame of execution.

Also, as a second aspect, provided either alone or in combination with the first aspect. US 2008/0127200 also proposes an execution environment operable such that the execution of one or more components of a computer program is carried out in a plurality of sequential frames of execution, the execution environment being further operable to process communications between components of the computer program in a predetermined order.

Thus, an execution environment embodying the first and second aspects of the invention disclosed in US 2008/

0127200 is advantageously structured to facilitate the execution of program code in "frames." i.e. or units of time or work, with at least one component of the program comprised in each frame of execution. Furthermore, the execution environments proposed in US 2008/0127200 are highly advantageous in that they facilitate the execution of a computer component with a high degree of determinism. This means that if corresponding objects (i.e.—a discrete component portion, for example implementing a character in a game, that is executed on two different machines) in the same state execute the same code on two different computers, or at two different times, then the new state of the object will advantageously be identical on both machines or at both times.

According to a particularly preferred embodiment of the present invention, the execution of program objects is conducted in accordance with the techniques described in US 2008/0127200. Thus, an apparatus embodying the present invention is preferably provided with an execution environment operable such that the execution of the components of the computer program is carried out in a plurality of sequential frames of execution, wherein the execution environment is further operable to: i) allow communication between one said component and another said component in different frames of execution; and ii) prevent communication between one said component and another said component in the same frame of execution. Alternatively, or additionally, an apparatus embodying the present invention is provided with an execution environment operable such that the execution of one or more components of a computer program is carried out in a plurality of sequential frames of execution, the execution environment being further operable to process communications between components of the computer program in a predetermined order.

The communication between components may include at least one of sending a message or reading at least a portion of the state of another component. The communication may take place between components of adjacent frames or between components of frames which are more than one frame apart. Dividing the program into sequential frames also advantageously allows for highly parallel execution of program components. Therefore, as the number of components in a program increases, execution of the program code can be readily distributed over multiple processors when a single processor is no longer sufficient. As such, different program components, or different objects, can be readily executed in parallel.

Preferably, messages can be sent from object to object or between the outside world (e.g. the user, or a C++ program) and an object. Messages allow communication between objects within the system and the outside world. They can be transmitted across a network. They are delivered to a particular frame number and target object. According to embodiments of the present invention which are operable to prevent communication between components in the same frame, if an object sends a message, then the message can only be received in a different, and subsequent, frame. Receipt of messages by an object may preferably be implemented by means of a queue of incoming messages provided for each object at each frame. The queue should preferably be ordered using a deterministic ordering method, so as to maintain network consistency.

A deterministic ordering method involves the entire set of messages received for a given object in a given frame being sorted on the basis of
 order of sending; and
 the identity (ID) of the sender.

Therefore, if an object sends two messages: A and then B, the recipient will receive A and then B in that order. Thus, the order of arrival is the same as the order of sending. If two objects (1) and (2) each send two messages A1 and B1, and A2 and B2, the recipient will receive them in the order A1 B1 and then A2 B2, so that order is preserved locally (in the messages from a single sender) and globally (messages from multiple senders are ordered by the ID of the sender). In the case of multiple senders, the act of sending may overlap e.g. objects (1) and (2) may execute concurrently. There is preferably an additional ordering on the ID given to a client, to allow user input messages to also be sorted e.g. if two clients send a user input message to the same object, the order is determined by the client's ID.

The outside world within the context of the present invention is software written in other languages that do not follow the preferred conditions for writing a program to be executed within an execution environment of the proposed invention. The outside world does important work like receiving information from the user, transmitting streams of data over the network, or displaying results back to the user. The outside world should preferably not violate preferred conditions of the system that will be discussed later. The outside world can send messages to objects within a system embodying the present invention, may keep references to objects within the system, create objects in the system, create sets of objects to duplicate or execute speculatively, or read the state of objects within the system. The outside world cannot modify the state of any object within the system, although it can be called via functions. However, in order to ensure such function calls do not introduce the potential for a divergence between the execution of corresponding objects on different machines, they should preferably return exactly the same result on every computer in the system whenever the parameters to the function are the same and the frame number the function is called on is the same. Such function calls should preferably not be able to modify the local state of the calling object.

The division of a computer program into a series of frames, i.e. units of time or work, advantageously enables synchronization so that the state of program components may be consistently defined. According to preferred embodiments of the present invention, objects can only change their visible state within a frame and can only read the values of other objects at the end of the previous frame. Messages are also attached to or associated with, a given frame of the computer program. Frames could be attached to a clock, so that a new frame is started every ⅙₀th of a second (for example) or, a new frame could start as soon as the last frame is finished or, frames could be executed in a pipeline with individual object execution starting whenever enough input data are available for the execution to complete.

Frames could also be hierarchical, wherein a universal frame clock is broken down into sub-frames. This configuration would advantageously allow a set of objects to operate to a much faster frame counter for a particular algorithm that is distributed across multiple objects. It is envisaged that the coarsest granularity of a frame would correspond to network frames, while the finest granularity of a preferred frame would correspond to operations on the current processor. According to embodiments of the present invention, the state of an object is only visible at the start or end of a frame and, therefore the state is the same at the start of one frame as it was at the end of the previous frame.

It will be appreciated that, according to embodiments of the present invention which rely upon an execution environment operable to prevent intra-frame communication, the state of the system at the start of a frame is a function of only the state of the system at the end of the previous frame and any external messages into the system. The state of the system at a frame start consists of the state of all objects at that frame start and any messages sent from the previous frame. Thus, in respect of a computer program comprising a plurality of objects, it is possible to define a subset of all the objects in the system. The subset may be a proper subset or, in the case where there is one object, a non-trivial subset. The state of the subset of the objects in the system at a particular frame will be a function of the state of those objects at the start of the previous frame, and all messages sent into the subset of the objects from the previous frame.

Formally, if $O_{n,i}$ is the state of object/at the start of frame n, and $M_{n,i}$, is the list of messages sent from object/from frame n to frame n+1, and $f_{n,i}$ is the function that corresponds to the behavior of object i in frame n, then:

$$(O_{n+1,i}, M_{n+1,i}) = f_{n+1,i}(O_{n,i}, M_{n,i}). \quad \text{i)}$$

This is a function of frame n that is returning the state of frame n+1. As can be seen, the entire state of frame n+1 is a function only of frame n. This means that there is no interdependency within frame n, so all objects in frame n can advantageously be executed in parallel.

Preferably, each frame of each instance of an object comprises object data and an object execution point. At the start and end of every frame, the execution point will therefore be at a next-frame statement, except in the case of termination of computation, when the execution point will either be an error or quit. The next frame statement is the last instruction to be executed in a frame. Preferably, in use, an execution environment embodying the present invention is operable to execute each frame up to and including the next frame statement. Thus, the object state is modified iteratively whenever the object's code is executed. However, according to preferred embodiments, the iterative changes and intermediate states are never visible to any other objects, and only the state at the end of a previous frame is visible to other objects.

Embodiments of the present invention which rely upon an execution environment according to the teaching of US 2008/0127200 are particularly advantageous in the context of virtual film making techniques and may usefully provide methods and tools for directing the generation of a video data set within a virtual environment.

According to a fourth aspect of the present invention, there is provided an apparatus for generating video data derived from the execution of a computer program, the apparatus comprising:

i) an execution environment generation module configured to generate an execution environment operable to execute one or more components of a computer program such that the execution of each component is conducted in a sequence of execution frames;

ii) a recorder operable to record video data corresponding to a sequence of execution frames being executed by said execution environment, wherein said video data is sufficient to allow the state of any frame of execution to be recreated, and wherein said apparatus is operable to obtain a desired sequence of re-execution frames from video data, said sequence of re-execution frames being for execution in said execution environment; and iii) a frame state modifier operable, following an interruption of the execution of a sequence of re-execution frames by said execution environment, to allow modification of the state of a candidate re-execution frame, to obtain a modified sequence of re-execution frames for execution by said execution environment.

The step of modifying the state of one or more frames of re-execution can be advantageously facilitated according to embodiments of the present invention by taking advantage of the feature of inter-frame communication between program components. Moreover, it will be appreciated that interactions between program components are factored out into communications which can be usefully intercepted at a frame break and then altered, added, or repeated at will.

The data required to recreate a frame of re-execution may be considered as forming a set of program components whose interactions are evident from the communications exchanged between them. The step of reviewing inter-frame communications therefore gives an insight into the parameters which are effecting the visualization, and thus gives a user the opportunity to remove or modify recorded communications when they are in transit between program components.

The ability to modify the state of one or more frames of re-execution effectively permits interaction with the recorded video data, allowing recorded video to be easily and conveniently edited. Indeed, the ease of video creation and editing afforded by embodiments of the present invention lowers the cost and time of creating video, making machinima filming set within a virtual world a very viable option for the generation of 3D video.

Examples of interaction include:

Camera control, moving the camera view point—If the camera is implemented as a program object, it is possible to send messages to that object in a given re-execution frame which, for example, causes the virtual camera to alter its position in 3D space, reorient itself or re focus.

Actor creation and destruction, to add or remove actors from the world being recorded—In the case of actor destruction, this is achieved by selecting an actor [program object(s)] for removal from the virtual world and removing it from the given frame so that it is also gone from future frames. Objects can be created in various ways, either by sending a message requesting an existing object to spawn a new object, or via the insertion of a new object within the given frame of the execution environment.

Commanding objects to perform one of their repertoires of actions—For example, a "door" object can be commanded to open or close. Actors can be commanded to move, attack, speak or pause, for example by message passing or state mutation.

Actor mutation—It is possible to alter the internal state of a given program component directly. This could be as simple as changing the coordinates of the actor position to achieve teleportation, or altering statistics such as health to achieve a different graphical effect or action outcome.

Timing alteration—The interactions between actors, and the commands given to actors, could be moved in time either to earlier or later frames, to allow the timing of the generated video to be altered.

It will be appreciated that interaction may involve asking a component to do something, via one or more messages, or making a component do something, via direct manipulation of its internal state.

In any of the above embodiments or aspects, the various features may be implemented in hardware, or as software modules running on one or more processors. Features of one aspect or embodiment may be applied to any of the other aspects or embodiments.

The invention also provides a computer program or a computer program product for implementing the techniques described herein, and a computer readable storage medium having stored thereon a program for implementing the techniques described herein. A computer program embodying the present invention may be stored on a computer-readable medium, or it could, for example, be in the form of signal such as a downloadable data signal provided from an internet website, or it could be in any other form.

BRIEF DESCRIPTION OF THE DRAWINGS

For a better understanding of the present invention, and to show how the same may be carried into effect, reference will now be made by way of example to the accompanying drawings in which:

FIGS. 2A and 2B diagrammatically illustrate, at the frame level, a change in the mode of operation of an apparatus embodying the present invention;

DETAILED DESCRIPTION

Figure 1:
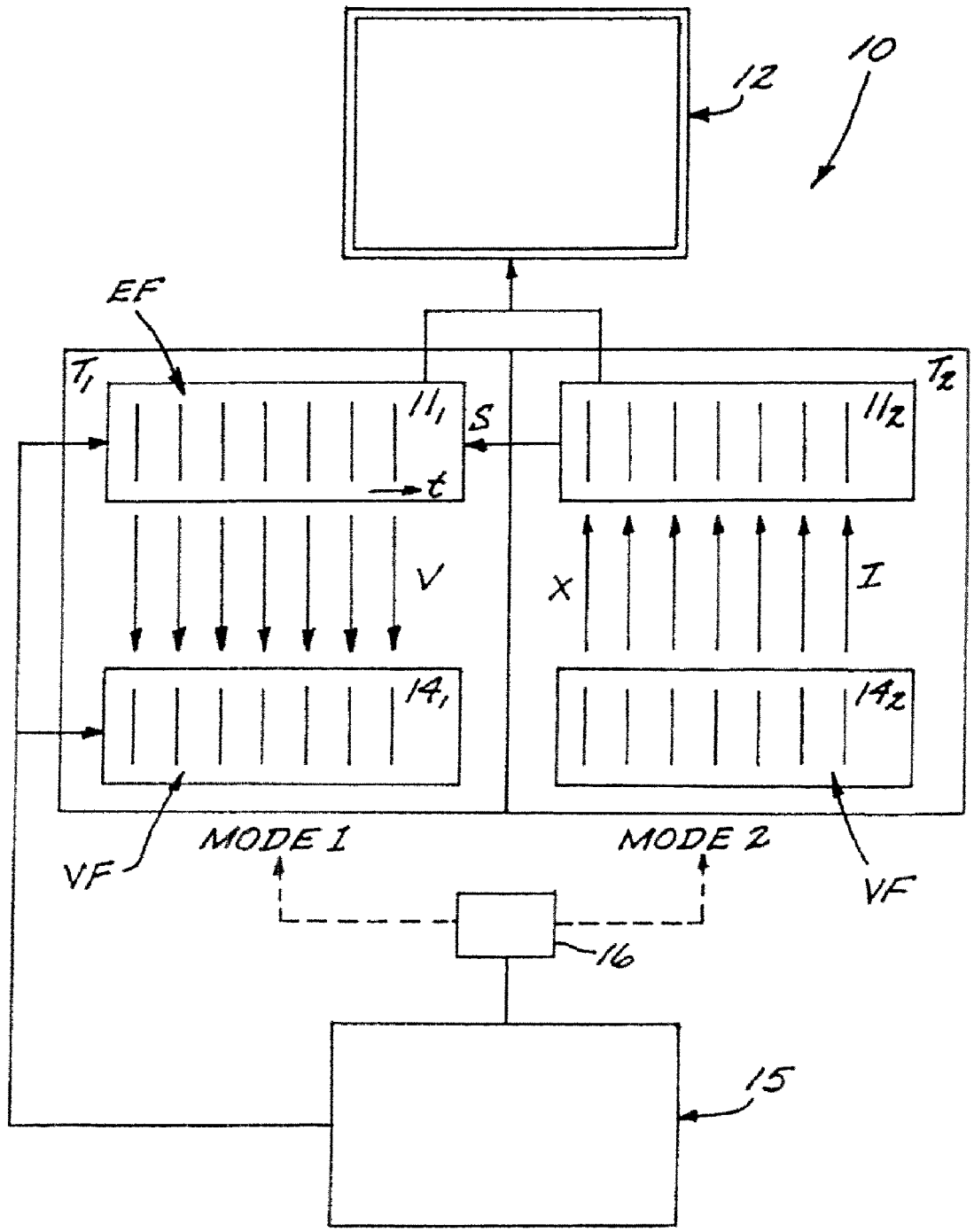
FIG. 1 is a diagrammatic view showing parts associated with a video data generating apparatus according to a first embodiment of the present invention.

FIG. 1 shows parts associated with a video data generating apparatus, generally designated 10, according to a first embodiment of the present invention, and it also illustrates the flow of data between the various parts of the apparatus in the first mode of operation (MODE1) and the second mode of operation (MODE2). The apparatus 10 comprises a deterministic execution environment 11 for executing program code of a computer program and a display means 12 for visualizing the result of execution of a computer program executed within the execution environment 11. A video data storage device or recorder 14 is provided, which is operable to store a sequence of video data frames, wherein the video data comprise replay or re-execution data.

At a time $T_1$, when the apparatus 10 is operating in a first mode of operation (MODE1), the execution environment $11_1$ is operable to execute the components of a computer program in a sequence of execution frames EF and to output video data V to the video data storage device or recorder $14_1$. As shown in FIG. 1, the video data are output to the video data storage device or recorder $14_1$ at regular intervals, e.g. shortly after the completion of a frame of execution. In this embodiment, the video data comprise information about the initial state of the program components in addition to information about the data input by a user via an interface device or apparatus 15, and/or interactions that have taken place between the program components. The resultant timeline of interactions forms a sequence of video data frames VF.

During the first mode of operation, data input by a user via the interface 15, such as a keyboard (or any other interface device or apparatus capable of an equivalent function), influence the outcome of execution and, thus, the visually evolving scene that is depicted on the display means 12.

At a subsequent time $T_2$, when the apparatus 10 is operating in the second mode of operation (MODE2), the sequence of video data frames VF is processed in order to obtain the same visualization sequence that was obtained when the program was previously executed using data input via the user interface 15. As shown in FIG. 1, in order to replay the video sequence from the beginning, the video data frames comprising an initial frame state and a timeline of interactions are input to the execution environment, as shown by the bold arrow X, followed by information I (input periodically). Thus, during the second mode of operation, the apparatus is operable to allow a user to observe the changing visual display, without being able to control the visualization.

A feature of the apparatus shown in FIG. 1 is that it is possible for a user to bi-directionally switch between the first and second modes of operation at any time, typically at the end of a frame, by operating, via the interface 15, a mode switching means 16. Importantly, the apparatus allows a user to change the mode of operation of the apparatus from the second mode to the first mode, as shown by the arrow S, and to obtain execution data sufficient to allow the frame of execution corresponding to the video data frame, switching the mode of operation, to be recreated.

According to the present embodiment, which utilizes re-execution data in the second mode of operation which is input to the execution environment 11 of the apparatus in order to replay a previously performed execution sequence and to observe the resultant visualization using a recorded timeline of interactions I, the change in the mode of operation effectively means that the execution environment ceases to receive recorded information from the video data storage device or apparatus, and, rather, receives real-time data via the user interface 15 for use in the continued execution of the program components.

FIGS. 2A and 2B illustrate, at the frame level, a change in the mode of operation of a video data generating apparatus embodying the present invention, from a second mode of operation to a first mode of operation. FIG. 2A shows a sequence of execution frames, F1 to F10, generated at a time $T_1$ during the execution of a computer program when the apparatus is operating in the first mode of operation. The frame state evolves during the execution procedure from an initial state IS, at the start of the first execution frame to a state A at the end of the first frame of execution. As shown in FIG. 2A, at the end of the execution procedure, the frame state has evolved to a state J. The changing frame state over time may be visualized on a display means, in the usual way, by querying the state of each frame to obtain display data. The generation of display data may involve interpolation techniques to obtain display data between two execution frames if necessary or desirable. Furthermore, during the initial execution procedure, video data are generated and stored in the video data storage device or apparatus of the video data generating apparatus 10.

FIG. 2B illustrates a change in the mode of operation of a video data generating apparatus embodying the present invention, from the second mode of operation (MODE2) to the first mode of operation (MODE1). At time $T_2$, the apparatus is operable to process video data frames V1 to V4 in order to obtain and observe a visualization of the execution that originally took place over execution frames F1 to F4. At V4, the mode of operation of the apparatus is changed from MODE2 to MODE1. At this point, the apparatus is operable to derive, from the video data comprised in video data frame V4, execution data X sufficient to allow the frame of execution corresponding to the video data frame to be recreated. This is denoted by F4'. Then, with the apparatus operating in the first mode of operation, a user is able to control the execution of the program components by supplying input data to the execution environment via a user interface. As such, assuming that the data input by a user to control the interactions of the program components is not identical to the input data supplied during the execution sequence initiated at time $T_1$, then the state of the program components at frame F10' will be J', and will be different from the state J at the end of frame F10.

It will be appreciated that the execution procedure illustrated in FIG. 2B may take place immediately after the change in the mode of operation, or it may take place at any subsequent time $T_3$.

Figure 3:
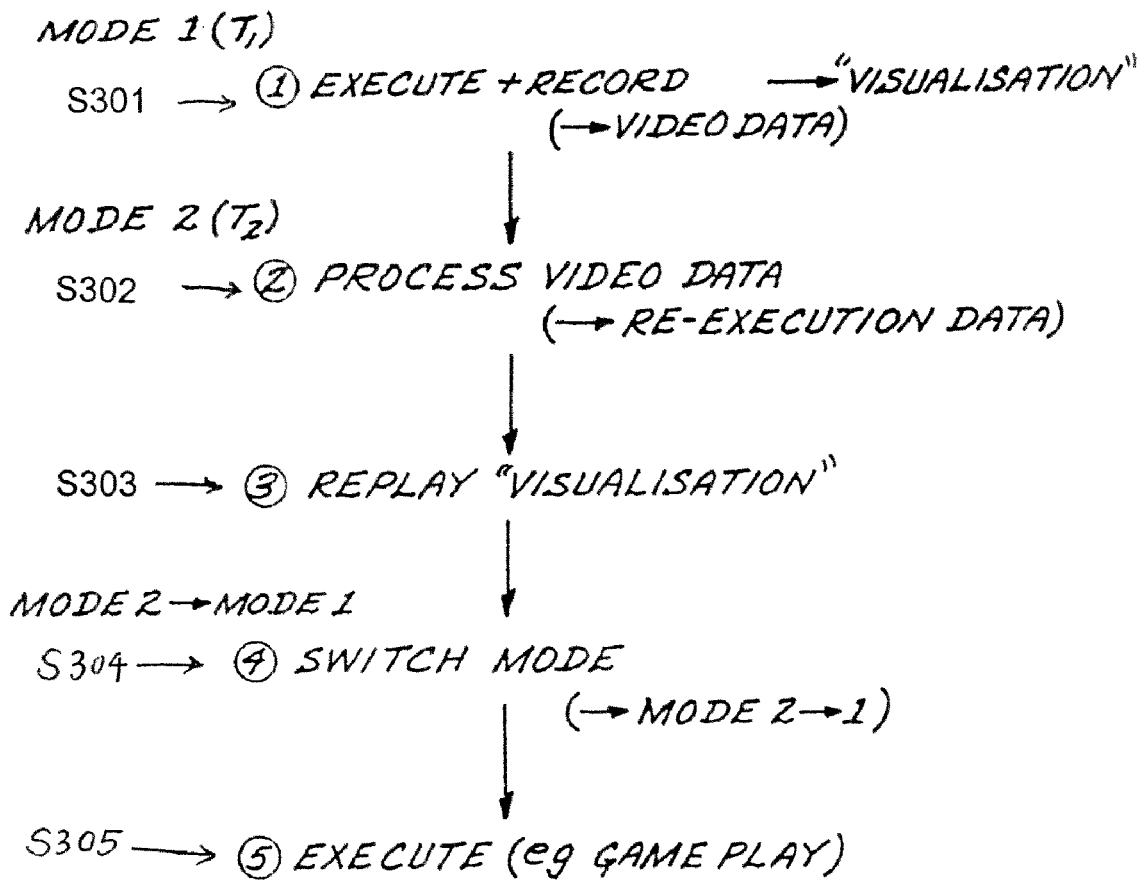
FIG. 3 is a flow chart illustrating the main steps carried out by a user according to a second embodiment of the present invention.

FIG. 3 illustrates the main steps carried out by a user according to a second embodiment of the present invention. At step S301, in a first mode of operation (MODE 1) which takes place at a time $T_1$, the components of a program (or a portion thereof) are executed in order to obtain a visualization of the result of execution on a display means. During the execution process, video data are generated and recorded. At step S302, in a second mode of operation (MODE 2) which commences at a subsequent time $T_1$, the video data generated in step 301 are processed to obtain re-execution data. In cases where the video data comprise replay data in the form of an initial frame state and a time line of communications to/from the program components (e.g. input via a user interface) and between the program components, the step of processing the video data will involve computing the state of a desired frame of re-execution (which may not be the initial state prior to execution of the first frame of execution) based on information about the initial frame state and the record of interactions that took place between the initial state and the desired frame of re-execution. In step S303, using the re-execution data generated in step S302, it is possible to replay the visualization for a given sequence of execution frames that was obtained in step S301.

At step S304, the method involves switching the mode of operation from a replay mode (MODE 2) to an execution mode (MODE 1). Then, in step S305, the user is able to continue to execute the program from the frame at which the mode of operation was switched. In effect, in the case of a computer game, a player can continue playing a game from any point within a recorded video sequence.

According to a second embodiment of the present invention, execution of the components of a program during the generation of video is conducted in a deterministic execution environment according to the teachings of US 2008/0127200.

For the sake of completeness, the following explanation concerns the operation and technical implementation of an execution environment according to the teaching contained in US 2008/0127200.

Each object has a main procedure that is called after the object is created. The main procedure, for example, may contain "next frame" statements. An object can modify its own state. However, the modified state cannot be visible to other objects until the next frame starts, so the code will keep a local copy of the object. Only the local copy is modified by the object. This modified local copy is returned by the object at the end of the frame. The execution system will store this returned modified object in a data store provided for the frame, keeping the original object in the data store for the original frame. Therefore, during exaction of frame n, it is necessary to store frame n−1 and store the results of execution of each object into n. Frame n will not be read until frame n+1 starts executing.

Figure 4:
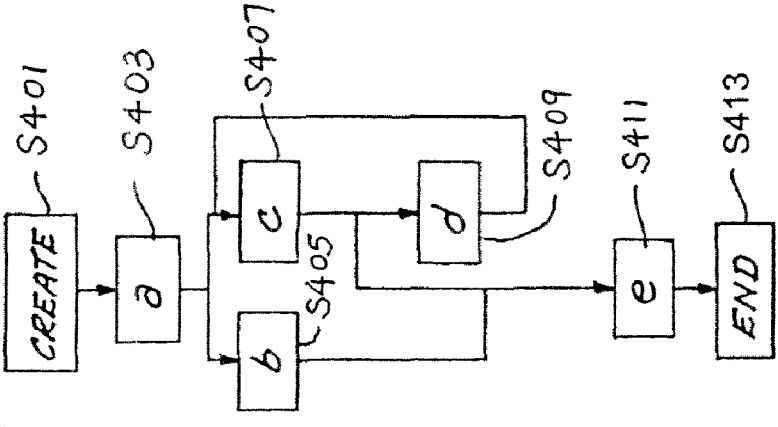
FIG. 4 shows an object flow graph according to a further embodiment.

FIG. 4 shows a flow diagram of the main procedure 400 for each object. The left-hand column of FIG. 4 shows the pseudo-code for an object. The middle column shows a flow chart or graph of the object with various code fragments a through e. The right-hand column provides a description of the other two columns. Here, a code fragment is defined as a section of code that starts with either the object creation or a single next-frame statement, wherein every exit point on the flow-graph is a next-frame statement or the object end, and wherein there are no next-frame statements within any code-fragment. Each code fragment is a function whose inputs are the state of all referenced objects in frame n−1 and all messages from frame n−1 to frame, and whose return value is the state of the object in frame n and the messages from the object in frame n to frame n+1. Each of the code fragments may be separately compiled into an executable form, although other options are possible. The executable form for each code fragment contains a single entry point, returns a modified version of the object and returns a reference to the code fragment to continue onto once the next frame starts. The executable code fragment cannot modify any data visible to other objects until the next frame starts. In order that data, such as the values of local variables, are preserved from one frame to the next, a stack frame can be created on a heap to store the values of local variables.

Execution is split up into frames. For each frame, the procedure 400 runs through all the objects in the system and executes each one. It is entirely possible to execute the objects out of order or in parallel (as shown, for example, in S405 and S407, discussed below). Each object has a state that includes an amount of data for the object and an execution point. When an object is created (S401), the execution point is at the start of the object's main procedure. When execution of the object's main procedure reaches a next-frame statement, then execution of that object stops for this frame. At the end of the frame, the new object state is stored. During execution of an object's code, messages may be created. These must be queued up and attached to a target object. Messages can only be read by the target object on the next frame. The messages may also need to be transmitted over a network as described below. Also, an object might read in messages. The messages must be read in a deterministic order. This is to allow out-of-order and parallel execution on multiple systems. The order can be defined by the system and is not described here. At the end of the frame (S413) all unused messages can be discarded. All modified objects are modified and the frame number is increased by 1. Execution can continue onto the next frame.

For example, as shown in the middle column of FIG. 4, in step S401 an object is created. In step S403, a code fragment a of the object is executed. In steps S405 and S407, code fragments b and c are executed in parallel. A code fragment (for example, c) may be compiled as a single routine and as a flag to indicate whether to continue on to the next code fragment (i.e., fragment d in step S409) or another code fragment (i.e. fragment e in step S411) once the next frame starts. Similarly, the code fragment b may be followed by the fragment e (step S411).

Figure 5:
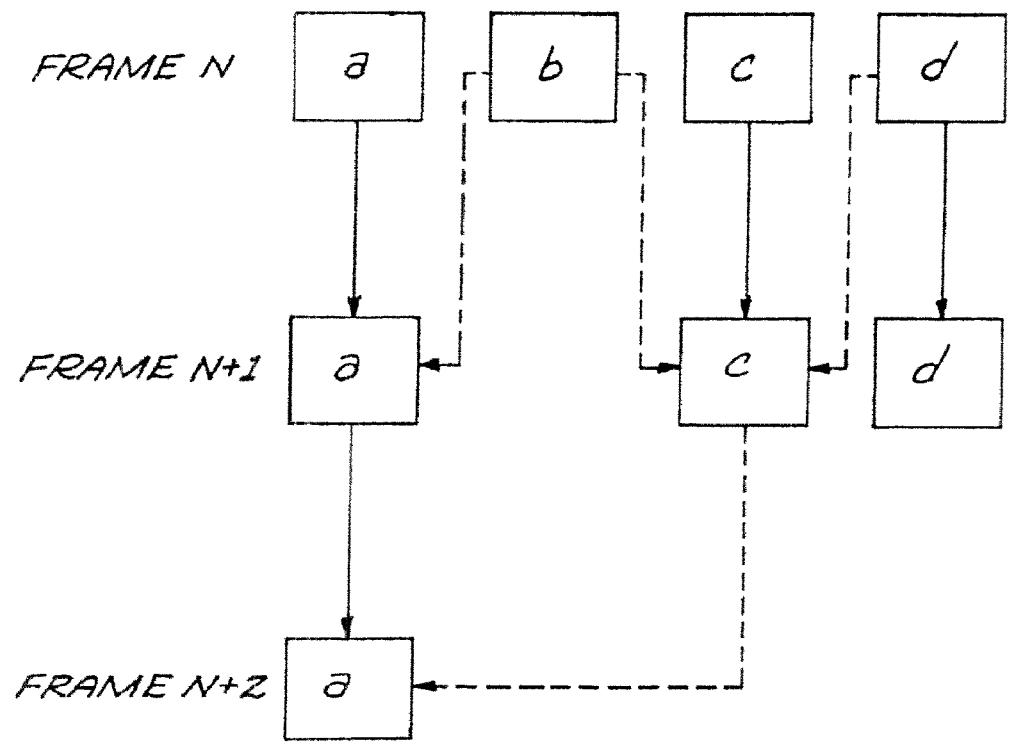
FIG. 5 is diagram of program execution.
Figure 5:
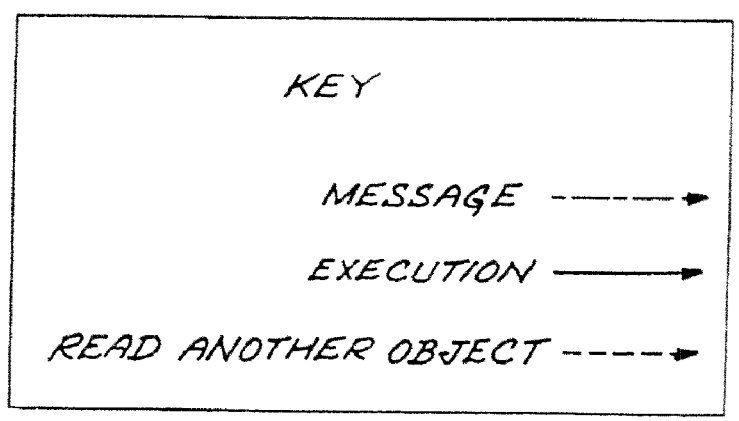

FIG. 5 shows the execution of four objects, labelled a to d, by means of a deterministic execution environment comprised described in US 2008/0127200. The state in frame n is known and execution of frame n has produced a message from b to a. In frame n+1, object c reads data from objects b and d. In frame n+2, object a reads data from object c. From FIG. 1, it can be seen that there is no communication between objects in the same frame. Message dependencies only exist from one frame to the next, while read dependencies only exist from the current frame to the previous frame. This feature is what allows the system to be executed in parallel and over a network. The diagram shows a partial execution in which a is calculated up to frame n+1, and b is ignored. This is to illustrate that it is possible to execute beyond the current consistent network state to calculate a speculative state (which will be based on a mixture of real input data and guessed input data). However, if it is later discovered that b in frame n+1 sends a message to a then, the execution of a in frame n+1 is potentially false and may need to be re-calculated.

The code for each object for each frame can be considered as a function of the value of all the referenced objects in the previous frame and all the messages received by the object. Therefore, if the objects in frame n and the messages from frame n to frame n+1 are consistent throughout the system, then the state of all objects in frame n+1 and the messages from frame n+1 to frame n+2 are just a function of data that are consistent throughout the system. Therefore, the objects will stay consistent as long as the initial state and initial messages are consistent and the functions are executed consistently. In other words, the system is deterministic because all of its causes are known.

To allow a program to be executed within an execution environment of the present invention, in particular within a deterministic execution environment according to the teaching of US 2008/0127200, it should preferably be suitably structured. To do this, it should be preferably written having regard to the following set of preferred conditions. These preferred conditions restrict what can be written in the language and ensure that program code can be safely distributed across a network. The preferred conditions are as follows:

(1) The program is written in such a way as to be split up into loosely coupled independent computations, each computation having zero or more instances in the execution state at any one time;

(2) Each computation instance has a behavior (code) and a state (data and execution point);

(3 (Execution is divided up into "frames";

(4) For each frame, the system runs through all the computations in the system and executes their code until they get to a "next frame" statement;

(5) Regarding communication between computations, computations may contain references to other computations, may involve reading the state of other computations, may modify their local state, may receive messages from other computations and may send messages to other computations;

(6) Computations cannot directly modify other computations, but may only send messages to computations and read a computation's state;

(7) If a computation changes its state, then the change is immediately visible to itself, but is not visible to other computations until the next frame; and (8) Computations can create other computations.

The other computations will exist starting with the next frame. For the sake of clarity, the following text will refer to the computations as objects. However, it will be understood that other forms of computation could equally be used.

Figure 6:
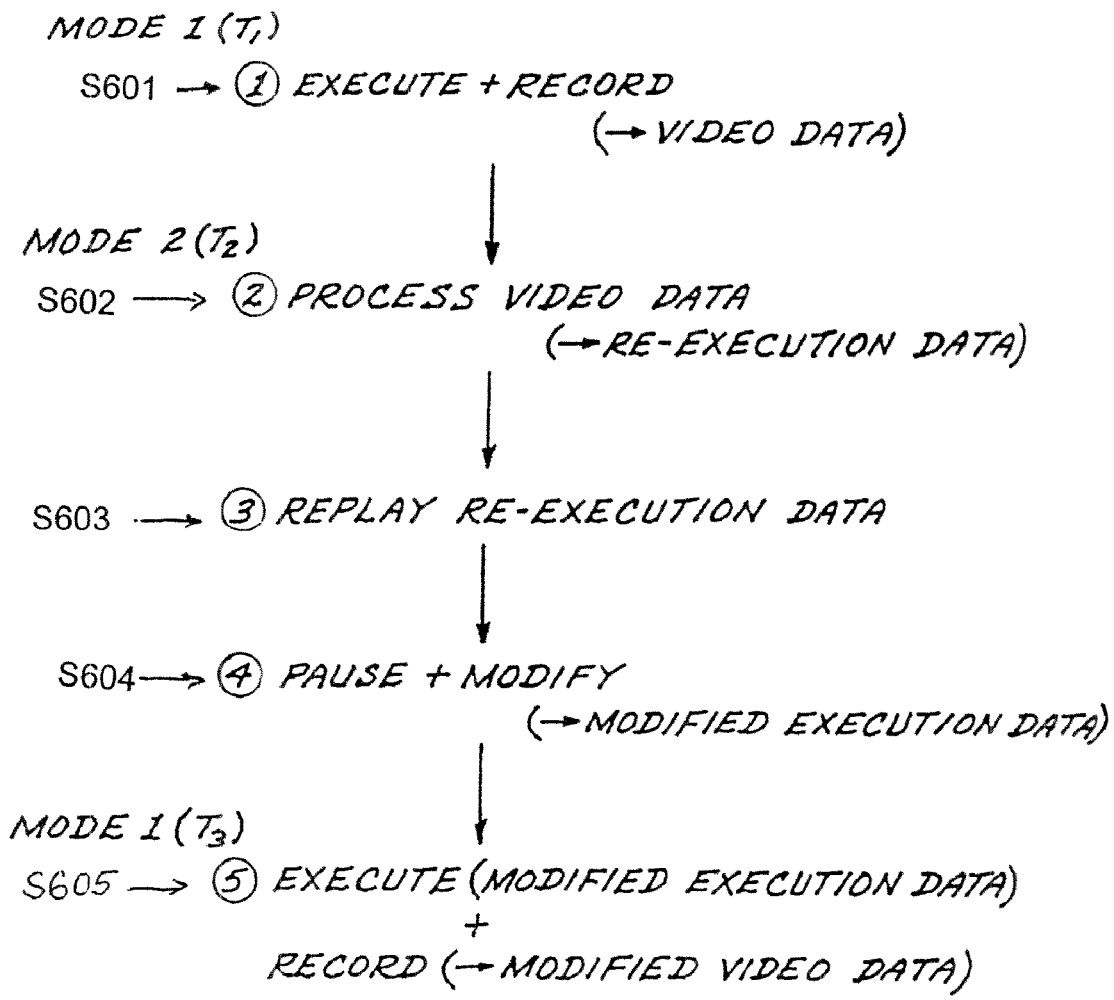
FIG. 6 is a flow chart illustrating the main steps carried out in a method of directing the generation of video data derived from the execution of a computer program according to a further embodiment of the present invention.

FIG. 6 illustrates the main steps carried out in a method of directing the generation of video data derived from the execution of a computer program according to a further embodiment of the present invention, which involves the modification of the state of a frame of video data.

At step S601, in a first mode of operation (MODE 1) which takes place at a time $T_1$, the components of a program (or a portion thereof) are executed in order to obtain a visualization of the result of execution on a display means. During the execution process, video data sufficient to allow the state of any frame of execution to be recreated are generated and recorded. In this embodiment, the execution of each component of the program is conducted in a sequence of execution frames and the execution environment is operable to allow communication between one said component and another said component in different execution frames, and to prevent communication between one said component and another said component in the same execution frame.

At step S602, in a second mode of operation (MODE 2) which commences at a subsequent time $T_2$, the video data generated in step S601 are processed to obtain re-execution data. In this embodiment the video data are processed to obtain a desired sequence of re-execution frames. This step may actually require no processing if the video data comprise an initial state and timeline of intervention, and if it is desired to replay the original execution from the initial frame. In step S603, using the re-execution data generated in step S602, it is possible to replay the visualization for a given sequence of execution frames that was obtained in step S601.

Step S604 involves pausing the execution of the re-execution data in order to allow a user to interact with the re-execution data. In particular, this gives the opportunity to modify the state of one or more frames of re-execution. At step S605, execution of the modified data commences whilst video data are again generated and recorded. In this way, it is possible to direct the resultant visualization as desired, via modification of video data as necessary, in order to generate a final video sequence.

Once the desired visual result has been obtained, the video data can, if necessary, be converted to an output format and may be stored on a digital recording medium such as a DVD.

Figure 7A:
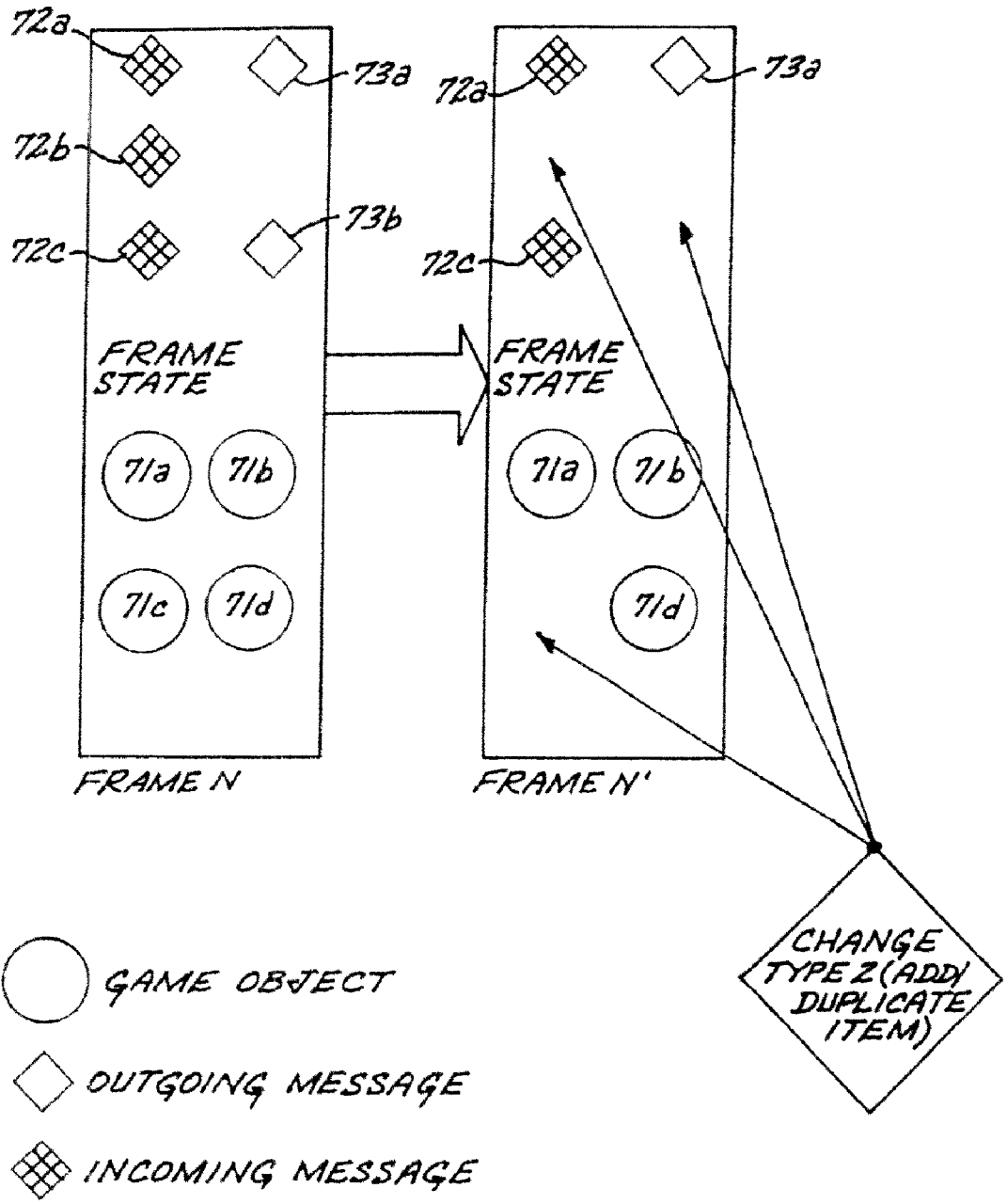
FIGS. 7A, 7B, 7C, and 7D diagrammatically illustrate various possible modifications that can be made to the state of a frame according to embodiments of the present invention.

FIGS. 7A, B, C and D illustrate the various ways in which the state of a frame may be modified, following the interruption of the execution of a sequence of recorded re-execution frames. In each of these examples, the computer program is a computer game and the program components comprise game objects.

FIG. 7A illustrates the execution of a sequence of recorded re-execution frames at frame N. The state of frame N is determined by the state of the four game objects 71a, 71b, 71c, and 71d, and by the state of the incoming messages 72a, 72b, 72c, and outgoing messages 73a, 73b.

By means of a user interface, it is possible to modify the state of frame N by removing one or more items from the frame. In FIG. 7A, the incoming message 72b and the outgoing message 73b are both deleted. Furthermore, the game object 71c is also deleted from the frame. Thus, a modified frame N' results from having a state that has been modified with respect to frame N.

Figure 7B:
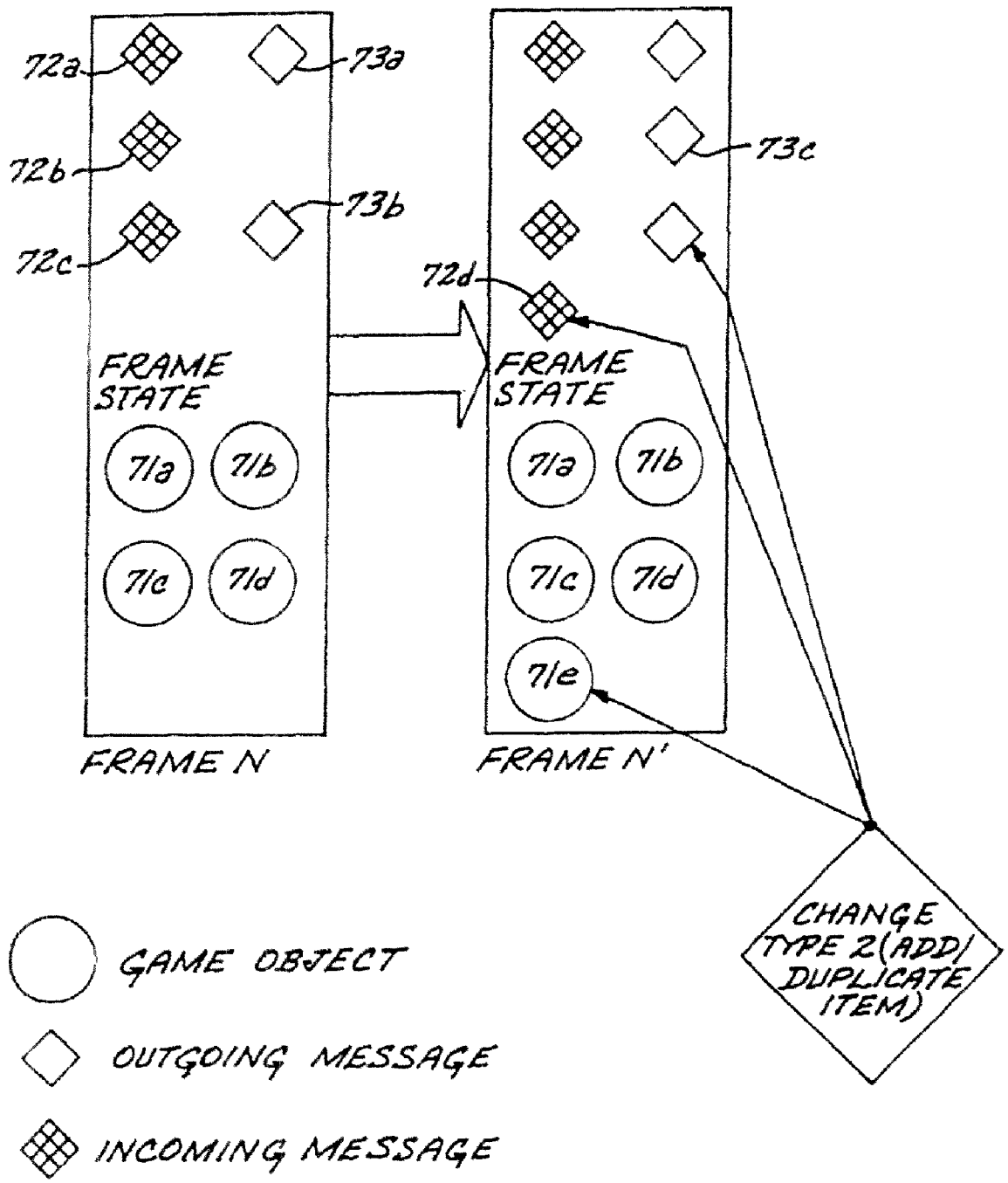

FIG. 7B illustrates the modification of frame N to frame N' by causing items to be added to the frame. This may be done by inserting a new item into the frame or by causing one or more items to duplicate themselves. In FIG. 7B, frame N is modified to frame N' by the addition of both an incoming message 72d and an outgoing message 73c. Furthermore, a new game object 71e is added to yield the modified frame N'.

Figure 7C:
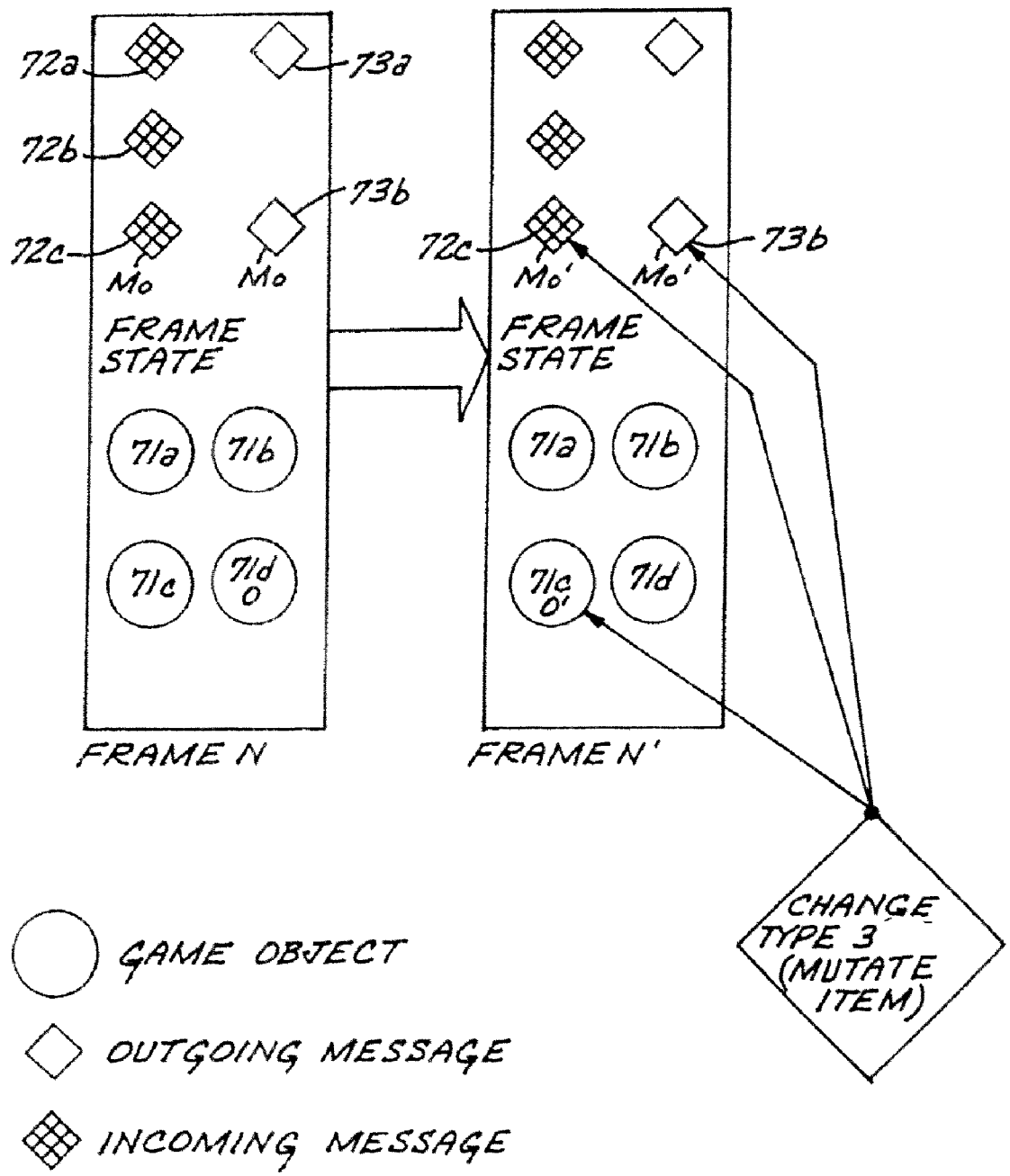
Figure 7D:
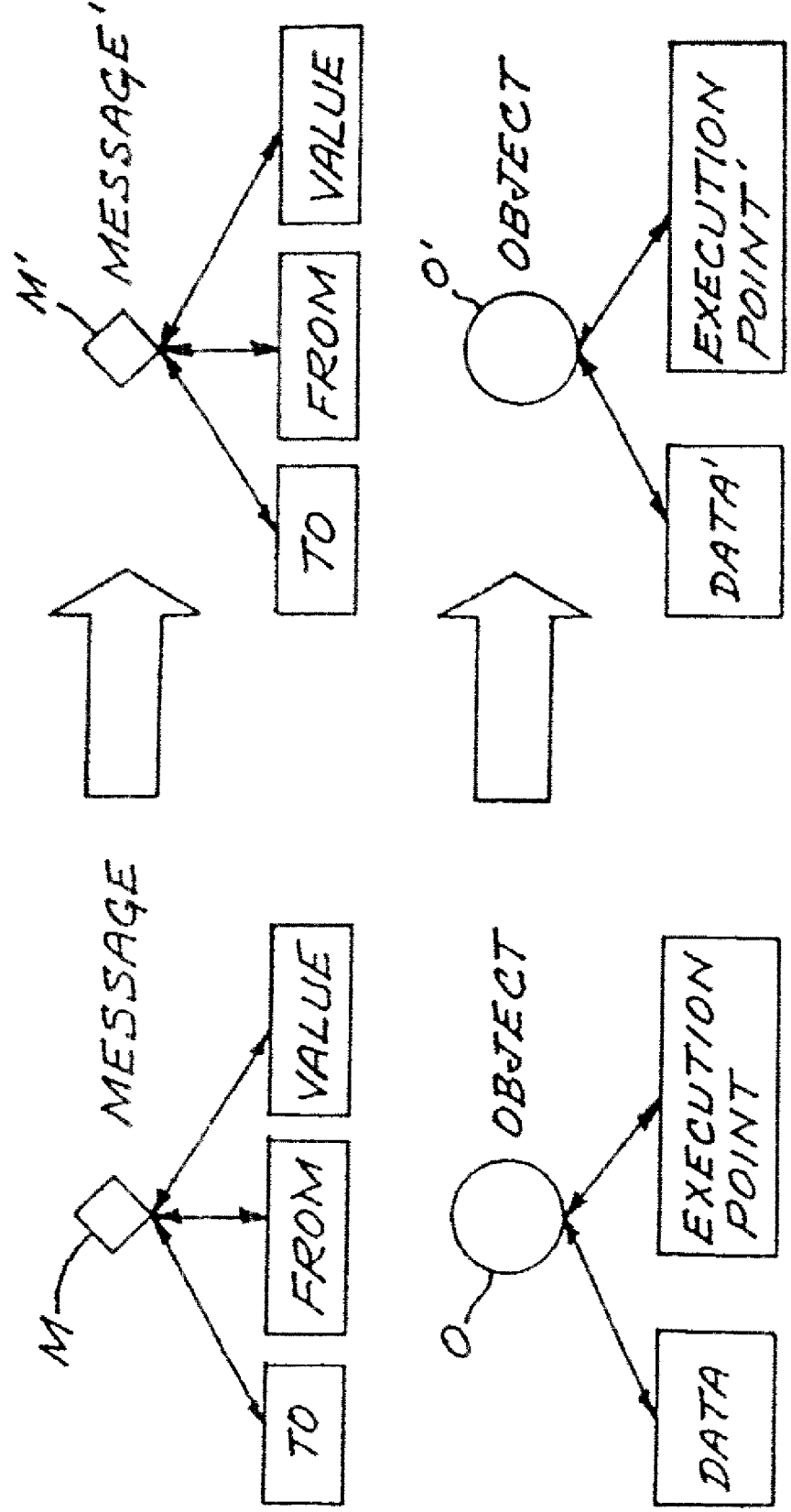

FIG. 7C illustrates the modification of frame N to frame N' by changing or mutating a number of items comprising the frame. In FIG. 7C, incoming message 72c and outgoing message 73b are both altered, as is the game object 71c. Some possible ways in which the mutation of a frame item may be implemented are shown in FIG. 7D, which shows that the state of an item within a frame may be charged without removing the item from the frame. In the case of a message M, it is possible to change who the recipient of the message will be and/or what the value of the message is. The message value can be an arbitrary scripting language data value (e.g. a single data item up to a complex graph). In the case of an object, it is possible to change the state of the object's data components, e.g. its fields and local variable values. It is also possible to change the point of execution.

It will be apparent to the skilled reader how these various mechanisms for modifying the state of a frame can very readily and usefully enable interaction with recorded video data in order to change the resultant visualisation of subsequent execution.

Having illustrated and described the invention in several embodiments and examples, it should be apparent that the invention can be modified, embodied, elaborated or applied in various ways without departing from the principles of the invention. The invention can be implemented in software programs and data structures stored on portable storage media, transmitted by digital communications, or other transmission medium, or stored in a computer memory. Such programs and data structures can be executed on a computer, to perform methods embodying the invention, and to operate as a machine, or part of apparatus, having the capabilities described herein.

The invention claimed is:

1. An apparatus for generating video data derived from the execution of a computer program, the apparatus having first and second modes of operation;
wherein, in the first mode of operation, the apparatus is operable to execute a computer program comprising a plurality of components, wherein the execution of each component is conducted in a sequence of execution frames, the apparatus being further operable in said first mode of operation to record video data comprising a sequence of video data frames corresponding to the sequence of execution frames; and
wherein, in the second mode of operation, the apparatus is operable to process video data which have been recorded during the previous execution of a computer program, in order to allow a user to obtain a visualization of the execution of that computer program, and wherein, in the second mode of operation, the apparatus is further operable to allow a user, at any frame of said sequence of video data frames, to change the mode of operation of the apparatus to the first mode of operation and to obtain, from said video data, the state of the corresponding execution frame of the computer program, the apparatus further comprising:
means operable to allow a user to modify said video data by a step selected from the group consisting of at least one of adding an item to the frame, deleting an item from the frame, and changing the state of one or more items comprised in the frame, such that, in the first mode of execution, the apparatus is then operable to execute the computer program starting from the modified frame using the modified data, and to record video data resulting from the execution of the computer program.

2. An apparatus as claimed in claim 1, wherein the video data comprise re-execution data.

3. An apparatus as claimed in claim 1, wherein the video data comprise information about the initial state of the program components at the start of the execution sequence, together with a stored time line of interactions communications which took place during the execution sequence between program components.

4. An apparatus as claimed in claim 1, wherein the apparatus comprises execution environment generation means configured to generate a deterministic execution environment for conducting the execution of said computer program.

5. An apparatus as claimed in claim 1, wherein the apparatus comprises an execution environment generation means configured to generate an execution environment operable such that the execution of the components of the computer program is carried out in a plurality of sequential frames of execution, wherein the execution environment is further operable to: i) allow communication between one of said components and another of said components in different frames of execution; and ii) prevent communication between one of said components and another of said components in the same frame of execution.

6. An apparatus as claimed in claim 5, wherein the execution environment is operable to only allow communication between components in adjacent frames of execution.

7. An apparatus as claimed in claim 5, wherein said communication between components includes at least one of sending a message to another component and reading data from another component.

8. An apparatus as claimed in claim 5, wherein said communication between components includes communications that are processed by said execution environment in a predetermined order.

9. An apparatus as claimed in claim 1, wherein at least one component is an object.

10. An apparatus as claimed in claim 1, wherein the execution is conducted in an execution environment which is distributed over multiple machines.

11. An apparatus as claimed in claim 1, wherein the execution is conducted in an execution environment which is distributed over a plurality of parallel processors.

12. An apparatus as claimed in claim 1, wherein the apparatus comprises an execution environment operable such that the execution of at least one component of a computer program is carried out in a plurality of sequential frames of execution, the execution environment being further operable to process communications between components of the computer program in a predetermined order.

13. A non-transitory computer readable medium encoded with a computer program which, when loaded into a computer, causes the computer to perform as an apparatus as claimed in any one of claims 1 to 12.

14. A method for generating video data derived from the execution of a computer program, the method comprising:
i) executing one or more components of a computer program in an execution environment operable such that the execution of each component is conducted in a sequence of execution frames;
ii) during said execution, recording video data corresponding to said sequence of execution frames, wherein said video data are sufficient to allow the state of any frame of execution to be recreated;
iii) obtaining a desired sequence of re-execution frames from said video data;
iv) executing the sequence of re-execution frames obtained in step iii) in said execution environment;
v) pausing the execution of said sequence of re-execution frames at a given frame to obtain a candidate frame;
vi) modifying the state of said candidate frame by a step selected from the group consisting of at least one of adding an item to the frame, deleting an item from the frame, and changing the state of one or more items comprised in the frame, to obtain a modified sequence of re-execution frames; and
vii) executing the computer program using data of the modified sequence of re-execution frames and recording video data resulting from the execution of the computer program.

15. A method as claimed in claim 14, further comprising the step of obtaining a visualization of the changing state of said sequence of execution frames.

16. A method as claimed in claim 14, wherein the execution environment is further operable to: i) allow communication between one of said components and another of said components in different execution frames; and ii) prevent communication between one of said components and another of said components in the same execution frame.

17. A non-transitory computer readable medium encoded with a computer program which, when loaded into a computer, causes the computer to perform the method as claimed in claim 14.

18. A method for generating video data derived from the execution of a computer program, the method comprising:
   i) obtaining a desired sequence of re-execution frames from video data recorded during the previous execution of a computer program comprising one or more components;
   ii) executing said sequence of re-execution frames in an execution environment operable such that the execution of each component is conducted in a sequence of execution frames;
   iii) pausing the execution of said sequence of re-execution frames at a given frame to obtain a candidate frame having a given state;
   iv) modifying the state of said candidate frame by a step selected from the group consisting of at least one of adding an item to the frame, deleting an item from the frame, and changing the state of one or more items comprised in the frame, to obtain a modified sequence of re-execution frames; and
   v) executing the computer program using data of the modified sequence of re-execution frames and recording video data resulting from the execution of the computer program.

19. A method as claimed in claim 18, further comprising the step of obtaining a visualization of the changing state of said sequence of re-execution frames.

20. A method as claimed in claim 18, wherein the execution environment is further operable to: i) allow communication between one of said components and another of said components in different re-execution frames; and ii) prevent communication between one of said components and another of said components in the same re-execution frame.

21. A non-transitory computer readable medium encoded with a computer program which, when loaded into a computer, causes the computer to perform the method as claimed in claim 18.

22. An apparatus for generating video data derived from the execution of a computer program, the apparatus comprising:
   i) an execution environment generation module configured to generate an execution environment operable to execute one or more components of a computer program such that the execution of each component is conducted in a sequence of execution frames;
   ii) a recording device operable to record video data corresponding to a sequence of execution frames being executed by said execution environment, wherein said video data are sufficient to allow the state of any frame of execution to be recreated, and wherein said apparatus is operable to obtain a desired sequence of re-execution frames from said video data, said sequence of re-execution frames being for execution in said execution environment; and
   iii) a frame state modifier operable, following an interruption of the execution of a sequence of re-execution frames by said execution environment, to allow modification of the state of a candidate re-execution frame by a step selected from the group consisting of at least one of adding an item to the frame, deleting an item from the frame, and changing the state of one or more items comprised in the frame, to obtain a modified sequence of re-execution frames for execution by said execution environment.

23. An apparatus as claimed in claim 22, wherein the execution environment generation module is configured to generate an execution environment operable such that the execution of the components of the computer program is carried out in a plurality of sequential frames of execution, wherein the execution environment is further operable to: i) allow communication between one of said components and another of said components in different frames of execution; and ii) prevent communication between one of said components and another of said components in the same frame of execution.

24. A non-transitory computer readable medium encoded with a computer program which, when loaded into a computer, causes the computer to perform as an apparatus as claimed in either of claim 22 or 23.

* * * * *